June 10, 1958

F. T. ARNOLD ET AL 2,837,966

FLOW-TYPE COPYING CAMERA

Filed Oct. 19, 1953

INVENTORS.
Francis T. Arnold, Selah S. Brewster Jr.
Carroll B. Collins, George B. Crouse
BY Norman N. Holland

ATTORNEY.

June 10, 1958 F. T. ARNOLD ET AL 2,837,966
FLOW-TYPE COPYING CAMERA
Filed Oct. 19, 1953 4 Sheets-Sheet 4
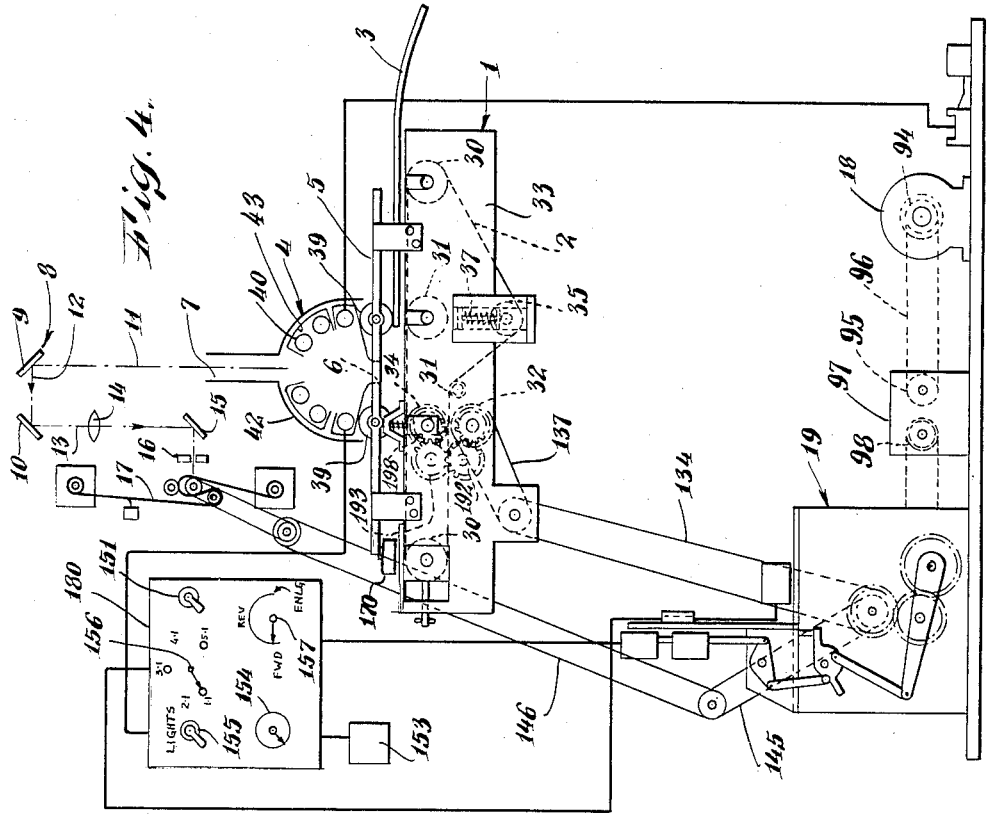
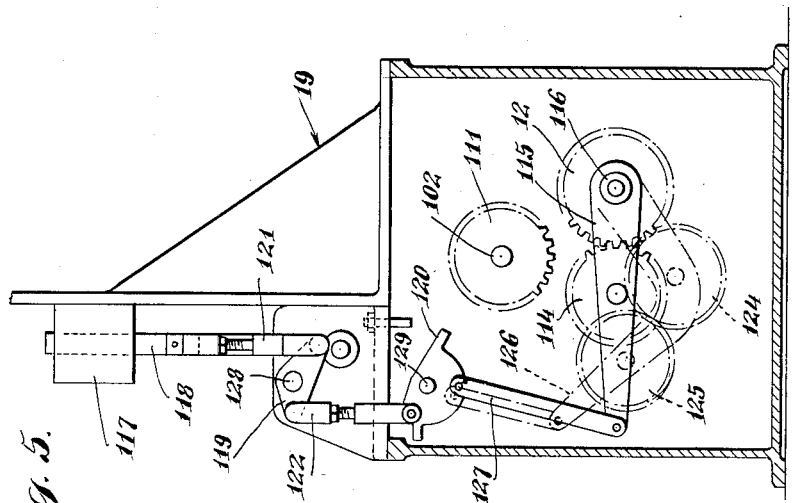
INVENTORS.
Francis T. Arnold, Selah S. Brewster Jr.
Carroll B. Collins, George B. Crouse
BY
Norman H. Holland
ATTORNEY.

United States Patent Office 2,837,966
Patented June 10, 1958

2,837,966

FLOW-TYPE COPYING CAMERA

Francis T. Arnold, Levittown, and Selah S. Brewster, Jr., Port Jefferson, N. Y., Carroll B. Collins, Pittsburgh, Pa., and George B. Crouse, Wading River, N. Y., assignors to Peerless Photo Products, Inc., Shoreham, N. Y., a corporation of New York Application October 19, 1953, Serial No. 386,934

5 Claims. (Cl. 88—24)

The present invention relates to cameras and more particularly to a camera for reproducing a copy of a drawing or other document which is moved at a continuous rate through the camera.

It has become increasingly important for many companies using large numbers of documents and drawings to have permanent, reduced-size reproductions made of these documents or drawings which are small enough to be conveniently stored, which are permanent records, and which can be used and read directly without magnification or enlargement.

An example of this problem occurs in engineering organizations where thousands of large-scale engineering drawings are produced yearly and where these drawings must be stored for long periods of time. A reduction in size of these drawings of the order of three or five to one allows a nine to fifteen times saving of valuable space and at the same time provides a drawing which may be easily read and used directly for reference purposes.

The present invention provides a camera that will make such a reduced copy in permanent and undistorted form. It also provides a camera which will enlarge the reduced-size copies when larger prints are needed.

Additional requirements for the handling and copying of thousands of drawings are that a copying camera be easily handled, rapid in operation, and compact in size. To achieve these results, the present camera uses a flow principle for copying the original documents. The original moves at a continuous rate along a conveyor beneath an illuminated slot. The illuminated slotlike portion of the original is projected by mirrors and a lens to a sensitized recording paper material which is moved in synchronism with the original to compensate for the motion of the original and the amount of size reduction being employed. Since only a small slotlike section of the original is being copied at a given instant, the overall size of the camera may be a fraction of the size of conventional cameras which copy the whole original at one time.

An object of the present invention is to provide an improved camera for producing permanent copies of drawings and other documents.

Another object of the present invention is to provide a camera for the high-speed production of reduced-size copies of originals.

Another object of the present invention is to provide a compact camera to produce reduced-size copies of large drawings or other documents or pictures.

Another object of the present invention is a method of producing a reduced-size photographic copy of a moving original.

Another object of the present invention is a method of photographing a moving document or drawing.

A further object of the invention is to provide a high-speed copying camera with a choice of reduction and enlarging ratios.

A still further object of the present invention is to provide a compact, high-speed copying camera which is simple to operate.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 3 is a schematic diagram of the electrical circuit;

Fig. 4 is a side elevation of the drive system of the camera of Fig. 1 with the illumination, and optical systems of the camera shown diagrammatically;

Fig. 5 is an enlarged side elevational view of the gear reduction device of the camera of Fig. 1;

Fig. 6 is an enlarged side elevational view of the film holder of the camera of Fig. 1;

Fig. 7 is a schematic diagram of an alternate optical system for the camera of Fig. 1;

Fig. 8 is an enlarged perspective view of the aperture adjusting device of the camera of Fig. 1;

Fig. 9 is an enlarged detail view of a mirror mounting clip;

Fig. 10 is an enlarged detail view of the slit closing roller mounting.

Figure 1:
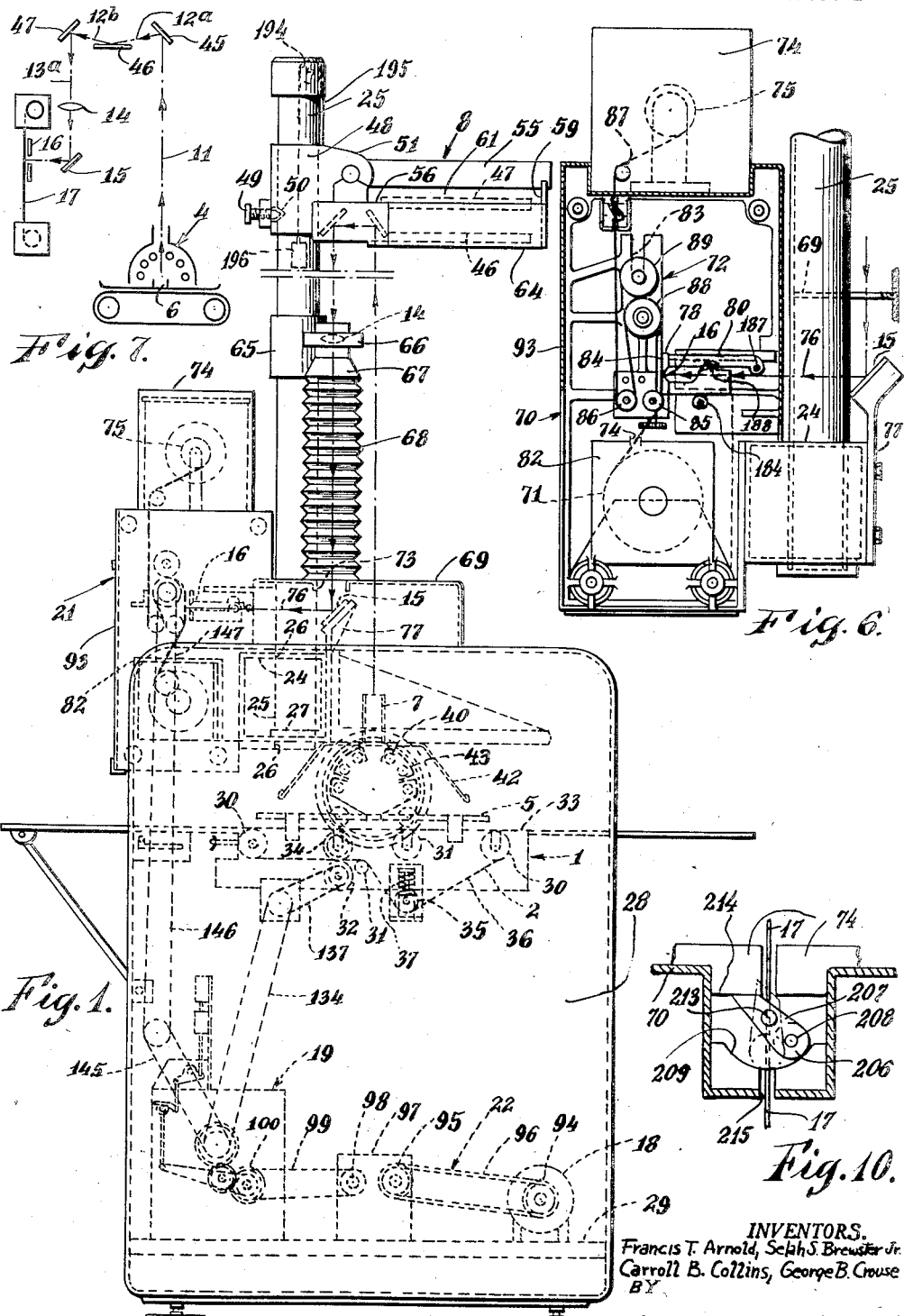
Fig. 1 is a side elevational view of the camera.

The theory of operation of the camera will now be described with particular reference to Fig. 4.

A moving conveyor 1 with a belt 2 mounted on a series of rollers carries an original 3 at a constant rate beneath a transverse light source 4. An opaque platen 5 is mounted above the surface of belt 2. Platen 5 has a slot 6 which extends across the width of the belt to subject a slit of original 3 to the light rays from light source 4. Rays from the illuminated slot 6 are reflected through an opening 7 in light source 4 vertically to a reflector system 8. This reflector system has two mirrors 9 and 10 mounted at right angles to each other and at 45° to the reflected rays 11 from slot 6.

Thus it will be seen that rays 11 are redirected as rays 13 parallel to rays 11. Rays 13 are directed through a lens 14 to a mirror 15. Mirror 15 is mounted at a forty-five degree angle to rays 13 to reflect them through an aperture 16 to moving film 17, where a photographic image of the illuminated area of the original 3 beneath slot 6 is formed.

The film 17 must be driven at a constant speed which has a fixed relation to the speed of the conveyor 2. Thus, if a three-to-one reduction is being made, film 17 will be driven at one-third of the speed of conveyor belt 2.

To accomplish the speed reduction and synchronization, the film 17 and the conveyor 1 are driven by a common drive motor 18. A variable speed reduction device 19 is used in the drive system between film 17 and conveyor 1 and drive motor 18. This variable speed reduction device 19 is connected to drive film 17 and conveyor 1 as will be described below and is adjustable to provide several film speeds for different amounts of reduction in the copying size and to change the direction of the conveyor belt 2.

The construction of the camera will now be described generally with particular reference to Figs. 1 and 2. The principal portions of the camera comprise the conveyor 1, the optical system 20 comprising reflector 8 and lens 14, the film holder 21, and the drive system comprising motor 18, speed reducer 19, and the connecting drives for film 17 and conveyor 1.

To mount these portions in a fixed rigid relationship, a rigid, accurately-formed box girder 24 is provided. Film holder 21 is attached directly to girder 24 by suitable bolts (not shown). The elements of the optical system 20 are mounted by arms on a vertical mast 25 which is fitted into accurately-machined recesses 26 in girder 24. Mast 25 is supported vertically by collars 27 and is held against rotation by suitable pins and set screws (not shown) through girder 24. Side frames 28, which in the preferred embodiment are cast metal, are fastened to the ends of girder 24 by suitable bolts not shown. Conveyor 1 is bolted between side frames 28. A bottom panel 29 fastened to side frames 28 supports the drive system 22 elements such as motor 18 and speed reducer device 19. The top and side spaces between end frames 28 are enclosed by suitable metal panels.

The elements of the camera will now be described in detail.

Conveyor

Figure 2:
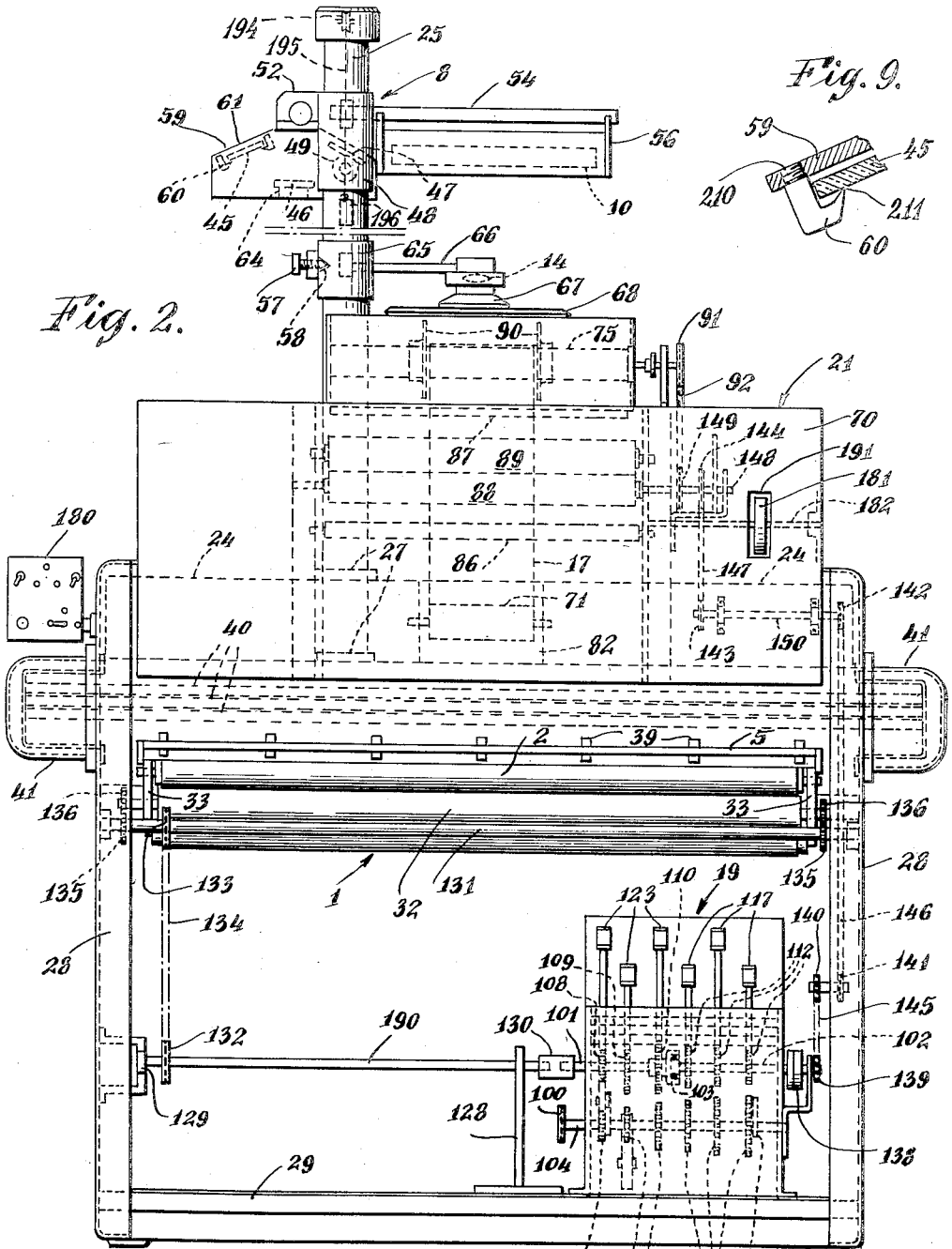
Fig. 2 is a front elevational view of the camera.

The endless belt 2 of conveyor 1 is supported and driven by a series of rollers as shown in Figs. 1, 2, and 4. These rollers are mounted in suitable bearings on conveyor side frames 33 and comprise idler end rollers 30, intermediate idler rollers 31, drive roller 32, pinch roller 34, and slack roller 35. As seen in Fig. 1, belt 2 is mounted on end rollers 30 and runs between drive 32 and spring-tensioned pinch roller 34. Slack roller 35 rides in a trough 36 formed in the slack of the belt and is held against the belt 2 by downward acting springs 37. Drive roller 32 is turned by a chain 137 of drive system 22, as will be more fully described below. Mounted a slight distance above the upper flat portion of belt 2 is a flat platen 5 formed of reinforced plastic or any other suitable opaque rigid material. Rollers 39 in platen 5 hold the original being copied firmly against belt 2 in a flat form so that the original underneath slot 6 is driven positively without speed variations. Slot 6 in platen 5 exposes a slitlike area of the original to the light source 4. Thus it is seen that an original 3 placed onto conveyor belt 2 will be carried beneath platen 5, held flat thereunder, and will be moved continuously from one side of the machine to the other.

Light source

A source of light 4 is provided above slot 6 in platen 5. In the preferred embodiment this source comprises six fluorescent lamp tubes 40 mounted in a semi-circular pattern as seen in Fig. 2 above slot 6. In order to give a uniform illumination at the ends of slot 6, the tubes 40 are carried well beyond the ends of the slot. Cup-shaped end housings 41 bolted to and extending outwardly from side frames 28 have conventional fluorescent tube terminals (not shown) located therein. Reflectors 43 direct the light rays toward slot 6. A slot 7 in the top of light shield 42 directly above slot 6 in platen 5 allows light rays to pass from illuminated slot 6 toward reflector 8.

Optical system

As described above and shown in Figs. 1 and 2, the elements of the optical system which project an image upon the sensitized film 17 are mounted on suitable sleeves upon rigidly fixed mast 25.

The first element struck by vertical light rays from illuminated slot 6 is the reflector element 8. This element comprises mirrors mounted to reflect the rays 11 from slot 6 toward lens 14. In the preferred embodiment, either two or three flat surfaced mirrors are used, depending upon whether it is desired to reverse the image or not. For example, when a right reading copy is desired, two mirrors are used and when a mirror image copy is desired, three mirrors are used.

Fig. 4 shows a schematic diagram of the optical system using a two-mirror reflector. Light rays 11 reflected from the illuminated area of slot 6 project vertically through slot 7 in light shield 42 upwardly to mirror 9 of reflector 8. Mirror 9 is mounted at a 45-degree angle to rays 11 so that rays 11 are reflected as rays 12 at 90° to rays 11 onto mirror 10. Mirror 10 is mounted at 90 degrees to mirror 9, thus reflecting the rays 12 at an angle of 90 degrees from rays 12 as rays 13. Rays 13 are thus horizontally spaced from and are parallel to rays 11 and are directed back towards mirror 15.

The double reflection from mirror 9 and 10 leaves the image of illuminated slot 6 with its original right reading orientation when it reaches lens 14. When it is desired to reverse the image orientation to provide a mirror image at lens 14, three mirrors are used in reflector 8. Figure 7 shows a schematic diagram of the optical systems where the three mirrors are used. Rays 11 from illuminated slot 6 in this case strike first mirror 45 which reflects rays 11 as rays 12a to mirror 46. Mirror 46 reflects rays 12a as rays 12b to mirror 47, whence they are reflected as rays 13a toward lens 14 and parallel to rays 11. When three mirrors are used, mirror 45 is set at such an angle that reflected rays 12a strike the center of mirror 46. Mirror 47 is then set at the same angle as mirror 45 to reflect rays 12b toward lens 14 parallel to rays 11.

It is clear that other angles of mounting may be used on both the two-mirror and the three-mirror system, since it is only necessary for the combined reflection angles of the mirrors to equal the total change in direction desired between rays 11 and 13.

The construction of the reflector 8 is shown in Figs. 1 and 2. A sleeve 48 slides vertically on mast 25 and is held in position thereon by a removable tapered pin 49 which engages suitably located hole 50 in the mast. Sleeve 48 has projecting clamps 51 and 52 into which horizontal rods 54 and 55 mount. Rod 54 supports a suitable frame 56 with an open bottom and which mounts mirrors 9 and 10 of the two-mirror portion of reflector 8.

Rod 55 is spaced at a convenient angle which is 90 degrees in the preferred embodiment from rod 54 and mounts a frame 59 for mounting the three-mirror portion of reflector 8. Frame 59 has a suitable cross section to provide a mounting for the mirrors 45, 46, and 47 at the angles discussed above. The mirrors 9, 10, 45, and 47 are supported by points 211 of clips 60 (Fig. 9). Clip 60 is attached to the frame by screw threads 210. Three clips 60 are used for each mirror. Mirror 46 is fastened by suitable screws or clamps on a flat support 64. Tapered holes 50 may be spaced as desired in mast 25 to allow for the adjustment of reflector 8. Counter weight 196 in hollow mast 25 helps to support reflector 8 by cable 195 and pulley 194.

Lens 14 is fastened to sleeve 65 slidably mounted on mast 25 by a bracket 66. A funnel-shaped adaptor 67 is attached to the edge of bracket 66 and holds bellows 68 in place between lens 14 and boxlike portion 69 of film holder 21. Lens 14 may focus rays 11 by swinging bracket 66.

An opening 73 in the top of portion 69 admits rays 13 to mirror 15 within the film holder 21. A removable tapered pin 57 fits into suitably located holes 58 to hold sleeve 65 in its correct location for the reduction or magnification desired.

Film holder

The film holder shown in Figs. 1, 2, and 6 provides a light-proof support for the moving recording film. It comprises a first hollow box compartment 69 containing the flat reflecting mirror 15; a second hollow compartment 70 containing the film supply spool 71; the film supply drive mechanism 72, and an adjustable aperture 16; and a third boxlike compartment 74 containing the film take-up spool 75. The three enclosures are fastened together and are mounted by suitable bolts on girder 24 midway between side frames 28.

Compartments 69, 70, and 74 are made of sheets of metal or other thin, opaque material suitably fastened together to form light-proof enclosures. The contents of the compartments will now be more fully described.

Mirror 15 is a flat-surfaced mirror which reflects vertical light rays 13 as horizontal rays 76 toward film 17. Mirror 15 in the preferred embodiment is mounted on a bracket 77 bolted to girder 24 and has a forty-five degree angle with respect to rays 13 and 76.

The left side (Fig. 1) of compartment 69 is open and connects with compartment 70 so that rays 76 pass through compartment 70 to film 17. Aperture 16 is located within compartment 70 and comprises two aperture bars 78 and 79 arranged on jaw members 80 and 81 hinged at 187 and 188 respectively whereby the space between bars 78 and 79 consists of a horizontal slit whose vertical width may be adjusted by rotating the jaw members 80 and 81. The adjustment control for the aperture is shown in Fig. 8. An adjusting wheel 181 is connected to a shaft 182 having a cam member 184. Cam 184 engages jaw member 81. Rotation of wheel 181 turns cam 184 and thus rotates jaw 81 which is held against cam 184 by spring 186. An equal but opposite rotation of jaw 80 is caused by the force of contact point 185 on jaw 81. Thus it is seen that the opening between bars 78 and 79 is controlled by wheel 181. Wheel 181 is accessible to the operator through opening 191 in compartment 70.

The sensitive film 17 is supplied in long lengths wound on a film supply spool 71. Spool 71 is mounted in a separate boxlike container 82 with a narrow slit 74 in the top to permit the film to be withdrawn. Container 82 fits into suitable clamps within longer compartment 70 and provides a removable light-proof shipping container for the unexposed film.

Film 17 passes from container 82 to drive mechanism 72 over a flat plate 84. Drive mechanism 72 comprises idlers 85, 86, and 87 and a drive roller 88 and pinch roller 89 mounted in slots 83. Pinch roller 89 holds film 17 tightly against drive roller 88 by its weight. The film is squeezed and moved between rollers 88 and 89 by the rotation of roller 88. Roller 88 is driven by the drive system as will be more fully described below.

The exposed film is wound on a film take-up spool 75 which is driven by a conventional slip drive spring 92 between pulleys 91 and 149 (Fig. 2). Sides 90 of spool 75 slide horizontally to fit the width of the film 17.

Compartment 70 has a removable cover 93 to permit the box 82 to be put in place and the film to be threaded onto spool 75.

Drive system

The drive system which provides a synchronized drive for the conveyor and the sensitized film is shown in Figs. 1, 2, and 4.

The source of power for the drive system is a conventional electric motor 18. Motor 18 is connected by the intermediation of sprockets 94 and 95 and chain 96 to a standard fixed ratio speed reduction device 97 which has a low speed output sprocket 98 connected by a chain 99 to sprocket 100 on adjustable speed reducer 19.

Adjustable speed reducer 19 is shown in Figs. 1 and 2 and more particularly in Fig. 5.

As described above, when the size of the original is being changed the relative speeds of the original 3 and the copying film 17 must be adjusted to compensate for the size change and the ratio between the speeds must be kept constant within one percent to prevent distortion of the copy.

Speed reducer 19 provides a conveyor output shaft 101 to drive the conveyor at a given speed by a drive system to be further described and a film output shaft 102 to drive the film 17 at another speed which is an exact fraction of the conveyor speed. As seen in Fig. 2, these two shafts are mounted concentrically but rotate independently since they are connected by a bearing 103.

Sprocket 100 is connected to an input power shaft 104. On this shaft are mounted a series of gears spaced conveniently along the length of the shaft. Above each of these gears is a gear on either output shaft 101 or 102. Three gears 105, 106, and 107 are on shaft 104 beneath gears 108, 109, and 110 on the conveyor output shaft 101, and three gears 111 on shaft 104 are each beneath a gear 112 on film output shaft 102.

Output shaft 101 is driven by an idler gear which meshes with one of the gears 105, 106, or 107 on shaft 104 and one of the corresponding gears 108, 109, 110 on shaft 101. Shaft 102 is similarly driven from shaft 104 by the meshing of an idler gear between a gear 111 and a gear 112. One gear on each shaft 101 and 102 is in mesh at a time with a gear on drive shaft 104. The ratio of teeth on the upper and lower gears and the idler gear is designed to give the shafts 101 and 102 the speed desired.

The idler gear meshing system for each set of gears 111 and 112 is shown in Fig. 5. Idler gear 114 is rotatably mounted on a rotating arm 115 which is held on shaft 104 by a suitable bearing 116. The free end of arm 115 is moved by a solenoid control system with a solenoid 117 and a linkage system comprising vertical shaft 118, rockers 119 and 120, and connecting links 121, 122, and 127. Rockers 119 and 120 are mounted on shafts 128 and 129. Solenoid 117 is a conventional type of electrically-operated solenoid which raises shaft 118 vertically when energized by the electrical control system which will be described hereafter. Link 121 rotates rocker 119 in a counterclockwise direction, thus causing link 122 to rotate rocker 120 similarly and link 127 to rotate arm 115 so that idler gear 114 is brought into mesh with the desired gear on shaft 102.

Since arm 115 is mounted concentrically with the gears on shaft 104, idler gear 114 may be positioned as shown in Fig. 5 to mesh with the gear 111 on shaft 104 in all positions of arm 115.

The number of gears on shaft 102 is chosen to provide the number of speed ratios desired. Three gears are shown in the preferred embodiment and the ratios between the gears 111 and shaft 102, the idler gear 114, and the gears 112 on shaft 104 may be chosen to provide three changes in speed as desired between shaft 104 and 102.

The idler gear meshing system for connecting shafts 101 and 104 is similar to that above described for shafts 102 and 104 with respect to gears 105 and 108 and 107 and 110, except that gear 105 and 108 on shaft 104 replaces gear 111 and gear 107 or 110 on shaft 101 replaces gear 112. Solenoids 123 replace solenoids 117. The ratios of these gears are chosen to provide two forward speeds of the conveyor for each of the three film speeds. In the preferred embodiment one ratio is used for reductions and one for enlargements.

The middle gear 109 on shaft 101 is driven in a reverse direction from the gears 108 and 110 to provide a reverse conveyor direction when mirror image copies are being made. The idler gear for this connection is shown dotted in Fig. 5. Two idler gears 124 and 125 are mounted on an arm 126. Arm 126 is mounted to rotate on shaft 104 so that idler gear 124 remains in continuous contact with gear 106. Idler gear 125 which meshes continuously with idler gear 124 is brought into mesh with gear 109 by a solenoid rocker and link system similar to that shown for arm 115.

Conveyor output shaft 101 is coupled by coupling 130 to a connecting shaft 190 mounted on suitable bracket 128 and bearing 129. Shaft 190 drives an idler shaft 131 beneath conveyor 1 by sprockets 132 and 133 and chain 134. Idler shaft 131 drives both ends of drive roller 32 of conveyor 1 through the intermediation of sprockets 135 and 136 and chains 137. Roller 34 is driven from roller 32 by gear train 197, 192, 193, and 198 (Fig. 4).

Output shaft 102 has a magnetic clutch 138 located on its outer end. Clutch 138 is a conventional magnetic clutch which is controlled by the electric circuit as will be further described below. The output shaft of clutch 138 is connected to sprocket 139.

Drive roller 68 which moves film 17 is driven from sprocket 139 through the intermediation of sprockets 140, 141, 142, 143, and 144, chains 145, 146, and 147 and shafts 148 and 150 (Fig. 2).

By the disengagement of clutch 138, conveyor 1 may be run while the recording film 17 is kept stationary.

Take-up spool 73 is driven from shaft 148 by pulleys 91 and 149 and connecting drive spring 92.

Electrical system

The electrical control system for the camera is shown in Fig. 3. The camera is powered from a regular 110-volt A. C. source which is connected to a main switch 151. A photometer 153 is used to read the reflective properties of the original 3 to be copied before it is inserted into the machine. A lamp 152 is used as a light source for the photometer 153 with an adjustable resistor 154 used to adjust the lamp 152 brightness in accordance with an empirical scale.

Light source 4, which comprises fluorescent tubes 40, is connected to the 110-volt source by switch 155.

As described above, the conveyor 1 speed is selected by energizing a solenoid 123 in the adjustable speed reduction device 19 and the film 17 speed is selected by energizing a solenoid 117. Two solenoids will be energized at one time as described above to set the speeds of both conveyor 1 and film 17. A rotary switch 156 is used to select one of the solenoids 117. Solenoids 117 are conventional 110-volt A. C. plunger-type solenoids and one side of their coil is connected directly to one side of the 110-volt source and the other side of each coil is connected to the other side of the 110-volt source through a terminal on switch 156. Thus switch 156 selectively energizes one of the three solenoids 117 according to its setting to select a film speed. Solenoids 123 are similarly selected by a switch 157 with three terminals, one for each solenoid.

While changing from one speed to another on either the conveyor output shaft 191 or the film speed output shaft 102, it is desirable to turn off drive motor 18 to facilitate the meshing of the idler gears. To do this automatically, a rotary switch 158 has been ganged with switch 156 and a rotary switch 159 has been ganged with switch 157.

Motor 18 is connected across the 110-volt input line through relay 160. Relay 160 is connected across the 110-volt line through switches 158 and 159. The three contacts of switch 158 are all connected to one side of the 110-volt line and the switch arm 161 is connected to all the three contacts on switch 159. The contact arm 162 of switch 159 is connected to relay 160. Relay 160 is thus connected across the 110-volt line only when both switches 159 and 160 have their arms on contacts. Arms 161 and 162 are connected by shafts 164 and 165 to arms 166 and 167 of switches 156 and 157. Relay 160 thus opens and shuts off motor 18 while the switches 156 or 157 are moved from one contact to another.

Magnetic clutch 138 is connected through relay 168 to rectifier 169 which is connected to the 110-volt motor relay supply. Rectifier 169 provides a D. C. voltage to engage the clutch when relay 168 is closed, thus operating the film drive as described above.

Relay 168 has an automatic control circuit which opens its normally closed contacts when there is no original being carried by conveyor 1, thus disengaging the clutch 138 and stopping the film 17.

A switch 170 is placed on conveyor 1 so that the original document 3 passes between the contacts 171 and 172 holding the switch open. As long as switch 170 is open, contact 174 of time delay 175 remains open and relay 168 remains in its closed unenergized position, keeping the magnetic clutch 138 energized and thus engaged.

When the original passes beyond switch 170, its contacts 171 and 172 come together, thus energizing the motor 176 of time delay 175, causing contacts 174 to close in a given time. When the contacts 174 close, relay 168 is connected across the 110-volt motor supply and it opens, causing clutch 138 to disengage and the film drive to stop. The motor 176 of time delay relay 175 may be replaced by a mechanical power take off from film drive 72 by suitable gears or sprockets and chains. The time delay allows the film 17 to run for a predetermined length of time to permit spacing of the photographic copy as desired regardless of the position of the original 3 on the conveyor.

In order to provide for the meshing of the idler gears such as gear 114 with the upper gears on shaft 101 and 102 when a gear change is made, an automatic motor interrupter device is used in the motor relay 160 circuit. This comprises a conventional time delay relay 200 with its motor 201 connected to its shaft 203 turning on arm 202 through one revolution each time the relay 200 is energized.

When the motor control relay 160 is first energized as the motor is turned on, the time delay relay 200 will also be energized. Arm 202 will rotate one revolution in the conventional manner. Arm 202 is positioned to contact normally closed microswitch 204 during a portion of its turn, opening switch 204 for a few seconds during the time of contact.

Motor 18 will thus run for a few seconds when first turned on and then will stop for a few seconds while switch 204 is held open by arm 202. Motor 18 will then restart as switch 204 recloses and will continue to run. The interruption of the motor 18 allows the idler gear to completely mesh.

Switches 151, 155, 156, and 157 and variable resistor 154 are mounted on control box 180.

Operation

The camera is first adjusted to provide the size and type of copy required. If a right reading copy is desired, the two-mirror reflector is swung into place on mast 25 above the lens 14. The switch 156 is set for forward direction of the conveyor. If a mirror image copy is desired, the three-mirror reflector portion is swung into place on mast 25 and switch 156 is set to run the conveyor 1 in its reverse direction.

To set the reduction or magnification in size required, the height of the reflectors 8 and the lens 14 are set by sliding their respective sleeves 48 and 65 so that pins 49 and 57 engage the correct holes 50 and 58. Switches 156 and 157 are set to give the correct relative conveyor and film speeds for the reduction or magnification desired. Film 17 is threaded within compartment 21.

The original to be copied is placed beneath exposure meter 153 to determine the correct opening for aperture 16. Wheel 181 is then turned to set aperture 16.

Main switch 151 and light switch 155 are now closed, starting conveyor belt 2 into motion and turning on light source 4. An original 3 to be copied is placed on the conveyor belt 2. As the original passes switch 170, it opens it and the magnet clutch 138 is engaged and the film drive runs the film 17 through camera. When the original passes beyond switch 170, its contacts reclose, causing the film 17 to stop until another original is put on the conveyor.

Compartment 74 with film spool 75 may be removed from compartment 70 while a length of film 17 remains in compartment 70. The film 17 is cut above roller 206 (Figs. 6 and 10). Roller 206 is mounted on bearings 208 on two arms 207 located at either end of compartment 74. Arms 207 are hinged at 213 to allow roller 206 to swing in groove 209 above slit 215. Film 17 passes upwardly into compartment 74 through slit 215.

When the film 17 is cut above roller 206, roller 206 presses against the film, preventing it from dropping back through slit 215. When no film is in the slit, the roller 206 swings over slit 215 to make it light-tight. When compartment 74 is replaced on compartment 70, its bottom contacts the top of arm 207 and swings roller 206 clear of slit 215.

It will be seen that the present invention provides a camera for producing copies of original documents which is efficient, small in size, easy to operate and rapid in operation. The camera is readily adjustable to handle a variety of reduction or magnification ratios. It is particularly useful in providing reduced copies of engineering drawings which are easily read with the naked eye and which retain their original proportions in the reduced scale.

The flow principle utilized enables the camera to be of a greatly-reduced size from that of the conventional copying camera which copies a stationary original.

As various changes may be made in the above embodiment without departing from the spirit of the invention, it is to be understood that all matter herein set forth is to be interpreted as illustrative and not in a limiting sense.

Having thus described our invention, we claim:

1. In a copying camera, the combination of a conveyor belt, a light source above said belt, an opaque platen between said light source and said belt having a transverse slot therein, a lens, an adjustably positioned reflector means to direct light rays from said slot toward said lens along a path of variable length comprising three mirrors, two of said mirrors mounted at right angles to each other and at forty-five degrees to said third mirror and said light rays, a film holder comprising an aperture, a film supply roller, a film take-up roller and a film drive roller, a drive motor for said conveyor belt and said film drive roller, and a drive speed reduction device in the drive connection between said motor and said film drive roller.

2. In a copying camera having moving recording film and a moving conveyor synchronized therewith and adapted to support an original to be copied on said film, an optical system comprising a reflecting means positioned to reflect light rays from the original toward said film comprising three mirrors, two of said mirrors mounted at right angles to each other and at forty-five degrees to said third mirror and said light rays, a lens between said reflecting means and said film to focus the reflected light rays on said film to form an image of the original, a unitary mounting means for said reflecting means adjustably positioned to vary the distance thereof from said film and said original to change the size of the reflected image, and an adjustable mounting for said lens adapted to focus the light rays to form an image of the original on the film for each position of said adjustably mounted reflecting means.

3. In a copying camera having moving recording film and a moving conveyor synchronized therewith and adapted to support an original to be copied on said film, an optical system comprising a reflecting means positioned to reflect light rays from the original toward said film, a lens intermediate said reflecting means and said film to focus the reflected light rays on said film to form an image of the original, said reflecting means comprising a bracket rotatably and slidably mounted on a vertical shaft and having a pair of mirror mounting arms projecting radially therefrom and angularly disposed from one another whereby each of said arms may be rotated to a position intercepting the light rays from the original, the first of said mirror mounting arms having two mirrors mounted thereon which are positioned to successively reflect the light rays towards said lens in a right reading sense, and the second of said mirror mounting arms having three mirrors mounted thereon which are positioned to successively reflect the light rays toward said lens in a reverse reading sense, and an adjustable mounting for said lens adapted to focus the light rays to form an image of the original on the film for each position of said reflecting means.

4. The copying camera as defined in claim 3 in which the mirrors on both of said mirror mounting arms are oriented to reflect the light rays through an angle of 180 degrees.

5. The copying camera as defined in claim 3 in which the mirrors on both of said mirror mounting arms are positioned to provide light paths of equal length between the original and said lens whereby the image on the copying film remains in focus as said bracket is rotated to change the light beam from the mirrors of one mirror mounting arm to the mirrors of the other.

References Cited in the file of this patent

UNITED STATES PATENTS

| | | | |
|---|---|---|---|
| 791,062 | Wetmore | May 30, | 1905 |
| 1,187,137 | Gall | June 13, | 1916 |
| 1,344,896 | Jobke | June 29, | 1920 |
| 1,539,322 | Morton | May 26, | 1925 |
| 1,627,976 | Knechtel | May 10, | 1927 |
| 1,912,708 | Hopkins | June 6, | 1933 |
| 2,292,825 | Dilks | Aug. 11, | 1942 |
| 2,411,694 | Place | Nov. 26, | 1946 |
| 2,439,055 | Pratt | Apr. 6, | 1948 |
| 2,606,478 | Pratt | Aug. 12, | 1952 |